United States Patent [19]

Wheeler et al.

[11] Patent Number: 4,793,418

[45] Date of Patent: Dec. 27, 1988

[54] HYDROCARBON FLUID SEPARATION AT AN OFFSHORE SITE AND METHOD

[75] Inventors: Steven A. Wheeler, West Byfleet; Mark E. Taylor, Twickenham, both of England

[73] Assignee: Texaco Limited, White Plains, N.Y.

[21] Appl. No.: 81,052

[22] Filed: Aug. 3, 1987

[51] Int. Cl.$^4$ ............................................. E21B 43/36
[52] U.S. Cl. .................................. 166/357; 166/265; 210/170; 405/195
[58] Field of Search ...................... 166/357, 265, 267; 210/170, 188, 747; 55/36, 171, 172; 405/195, 210

[56] References Cited

U.S. PATENT DOCUMENTS

| | | | |
|---|---|---|---|
| 1,490,462 | 4/1924 | Gill | 55/172 |
| 2,767,802 | 10/1956 | Orrell | 166/357 |
| 3,756,409 | 9/1973 | Carmichael et al. | 210/170 |
| 3,875,998 | 4/1975 | Charpentier | 166/357 |
| 3,893,918 | 7/1975 | Favret, Jr. | 210/170 |
| 4,198,300 | 4/1980 | Williams | 210/170 |
| 4,330,402 | 5/1982 | Le Boeuf | 210/170 |
| 4,506,735 | 3/1985 | Chaudot | 166/357 |
| 4,519,725 | 5/1985 | Mott et al. | 405/195 |
| 4,626,360 | 12/1986 | Senyard, Sr. et al. | 210/188 |

Primary Examiner—Jerome W. Massie, IV
Assistant Examiner—Bruce M. Kisliuk
Attorney, Agent, or Firm—Robert A. Kulason; James J. O'Loughlin; Robert B. Burns

[57] ABSTRACT

An offshore marine structure and method, which structure includes a leg supported deck which holds hydrocarbon fluid processing equipment above the water's surface, and includes vertically aligned conductor guides. A self supporting fluid separator is positioned in said marine structure to receive a multi-phase stream of a hydrocarbon fluid from one or more wells. An upper segment of the fluid separator is slidably registered in vertically aligned conductor guides. A lower segment of the separator is embedded in the sea floor and operably engaged with said upper segment. A conductor riser is adjacently positioned by conductor guides in the marine structure to receive hydrocarbon liquid from the fluid separator. Discrete liquid, and combined vaporous flows are then conducted to the processing equipment for further handling.

12 Claims, 2 Drawing Sheets

HYDROCARBON FLUID SEPARATION AT AN OFFSHORE SITE AND METHOD

BACKGROUND OF THE INVENTION

The production of hydrocarbon fluids from a subsea reservoir often results in oil, gas and water being transferred concurrently through a common pipeline. In the instance of producing marginal, subsea, satellite fields, a large diameter pipeline is utilized. This pipeline, sometimes several miles in length, is installed between the remote field and the production platform or facility. Often, the selection of the pipe diameter results in two phase slug, or alternating gas-liquid flow passing through the pipeline.

Producing operations to enhance recovery from a hydrocarbon holding reservoir sometime necessitates the facility of gas lift. This factor, although productive, is known to induce intermittent gas liquid flowing conditions in the pipeline.

A reasonably constant liquid flow to processing equipment at a remote offshore structure normally requires an intermediate buffer apparatus, which treats the two phase flow. The latter can be a large vessel or tank which functions to absorb the liquid slugs that will provide steady liquid feed during the passage of the intermittent gas bubbles. The current trend of the oil industry to move into subsea production systems has mandated that subsea slug catchers be adapted to the arduous conditions of offshore operations.

The ordinary slug catcher, for use in a liquid-vapor stream usually embodies traditional design concepts. Such units, however, have proven to be relatively expensive both from the point of view of fabrication, and from the consideration of installing such units at offshore locations. For example, in North Sea operations, the installation of any form of subsea equipment can be a costly and dangerous operation. This is due primarily to the adverse weather conditions prevalent for much of the working season.

Where a marine platform or structure has been fixed in place at the sea floor, it is normally designed to accommodate a predetermined number of wells, and a certain volume of production. Such a structure is not normally provided with the necessary producing equipment to receive multi-phase fluid streams from one or more satellite wells. Often the marine platforms are not designed for expansion beyond their immediately contemplated capacity.

As a general practice, the platform structure and its ancillary equipment are designed to accommodate only original equipment with perhaps room for minor expansion. When it becomes necessary to add additional production equipment or otherwise to increase capacity, the platform's ability to sustain or support such equipment may be exceeded. Such a circumstance could endanger the safety and efficiency of the entire unit as well as personnel.

In accordance with the invention, to facilitate the production and handling of multi-phase hydrocarbon flows between a subsea well and an offshore producing platform, a pipeline carries the hydrocarbon flow to the marine platform. The latter flow will normally comprise a liquid hydrocarbon stream with intermittently spaced gas bubbles interposed in the liquid flow.

When this pressurized, two phase flow arrives at the production platform, it is discharged into an upstanding slug catcher to achieve a smooth flow. The primary function of the latter is basically to stabilize the flow to the processing equipment. It additionally, however, acts as a gas-liquid separator. In the present arrangement, the slug catcher comprises a first upright column to initially separate the fluid into liquid and gaseous phase. A second upright column receives residual liquid for additional separation.

Operationally, the gaseous segment of the hydrocarbon fluid stream will rise through the fluid separator. This upward movement is due to the weight of the gas as well as to the elevated pressure at which it arrives at the slug catcher. The liquid phase on the other hand will be passed into the adjacently positioned production riser. In said member, the liquid segment is further separated and the residual liquid pumped into the processing equipment at the platform's deck.

The slug catcher's upright members are incorporated into the existing platform structure beneath the work deck. Said added members are further maintained in a substantially upright position by being slidably registered in the platform's conductor guides which might otherwise go unused.

Operationally, there is provided a method for continuously treating or pretreating a multi-phase, hydrocarbon containing fluid stream having liquid and varporous phases. The stream is initially separated whereby to remove a major part of the vaporous phase.

The liquid phase is then transferred to a riser which holds an amount of the liquid phase, to allow a relatively quiescent separation of additional vapor. The two vaporous streams are then combined for further treatment. Concurrently, the substantially gas-free liquid is conducted from the reservoir.

It is therfore an object of the invention to provide a low cost subsea production system for a hydrocarbon fluid source such as subsea wells, including means to separate the produced fluid into liquid and vapor phases.

A further object is to provide a marine structure which includes liquid hydrocarbon processing equipment, and self-supporting separating means which handles a multi-phase stream of the fluid from offshore wells.

A still further object is to provide an elongated slug catcher for an offshore marine platform wherein the slug catcher is self-supported on the sea floor and is laterally braced in an upright disposition by conductor guides positioned within the platform structure.

DESCRIPTION OF THE DRAWINGS

Referring to FIG. 1, a subsea system of the type contemplated is shown wherein a plurality of offshore wells 10 have been inserted into a subsea reservoir 11 to produce hydrocarbon fluids from the reservoir. The result of such production normally includes both a liquid and gaseous component. These are forced to the sea floor 12, through well head 13, and thereafter carried by a pipeline 14 to a remote offshore marine structure 16.

Figure 1:
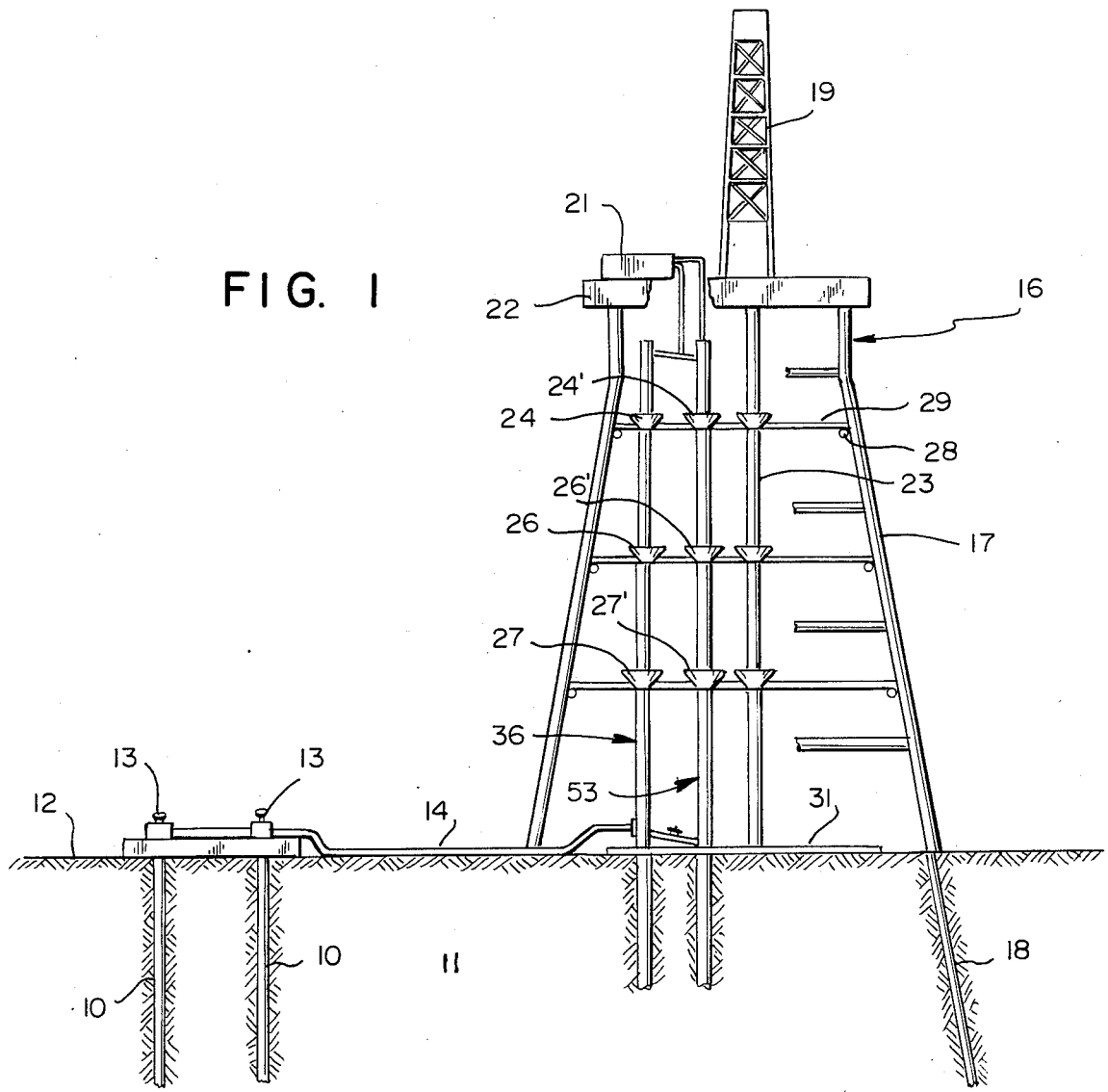
FIG. 1 is an environmental view of the subsea system presently contemplated.

As noted herein one method for enhancng or increasing the rate of production from a low pressure reservoir 11 is through gas lift, which forcibly injects a hydrocarbon gas into the liquid production flow. The result is to lessen the density of the produced liquid in wellbore 10 and thereby facilitate movement of the liquid upwardly through the well.

As presently shown, offshore platform or marine structure 16 is positioned remotely from the producing wells 10 and is fixed to the ocean floor 12. Said structure is therefore normally at a centralized location where it can receive hydrocarbon flows from a number of directions at which satellite wells have been drilled.

Platform 16 generally is comprised of a jacket having at least one, and preferably a plurality of substantially upstanding, tubular steel legs 17. The latter need not be in a vertical disposition; rather they are normally battered sufficiently to provide a relatively broad base at the lower end of the structure.

To fix the structure into sea floor 12, the respective legs 17 are provided with piles 18. These can most conveniently be driven downwardly through guides on or in the respective tubular legs, a desired distance into the substrate. The pile depth must be adequate for both supporting the platform, and for maintaining its stability during all manner of weather conditions.

The respective piles 18 are firmed in place by grouting or the like after being driven to a desired depth.

The upper end of structure 16 is comprised of a deck 22 which supports equipment necessary for a drilling and/or producing operation. Such equipment includes requisite drilling apparatus, for example a drilling derrick 19, together with its ancillary pipe storage fcility, storage areas and crews' quarters.

As noted, a necessary feature on this type of marine structure is fluid separating equipment 21. The latter initially receives multi-phase hydrocarbon fluid flow from the offshore wells drilled and completed from the marine structure 16, and separates it into liquid and vaporous components. The respective components can then be forwarded for treatment in contemplation of further storage or shipment to a shore based facility by tanker or the like.

Since marine structure 16 is initially installed over a drilling site, it will be provided with means for lowering a series of drilling conductors 23 downwardly from the deck 22 to the ocean floor 12. To facilitate this step in the operation, the structure is provided with a plurality of conductor guides 24, 26 and 27. The latter constitute a series of vertically spaced and aligned funnel-like members which are supported on braces 28 and 29 to accommodate a downwardly moving drilling conductor. Customarily, the drilling conductor comprises a cylindrical pipe approximately 26 inches in diameter, which confines a rotating drill string.

As a drill conductor 23 is lowered through the respective guides 24, 26 and 27, it will be maintained in a substantially vertical disposition. Over a period of time, if the subsea reservoir proves to be productive, the number of drilling conductors and drilled wells will be increased thereby eventually utilizing the drilling template 31 to its maximum capacity.

However, at such time as the formation beneath the offshore structure proves to be unproductive or depleted, conductor guides 24, 26 and 27, as well as the sea floor positioned template 31, are not fully utilized. When this phenomena occurs, a number of the conductor guides or drill slots will become redundant or remain unoccupied and unused.

As a practical matter, the aligned drilling guides 24, 26 and 27 are spaced sufficiently apart and vertically aligned that derrick 19 can lower a conductor 23. The latter will register sequentially in the vertically aligned guides until the conductor engages drilling templalte 31 at the sea floor. During this lowering period, additional lengths of conductor pipe are progressively coupled or welded to the conductor upper end until the conductor has achieved a desired depth. The drilling conductor can be fixed in place through a grouting technique by forcing cement into the substrate surrounding it near sea bed 12.

Figure 2:
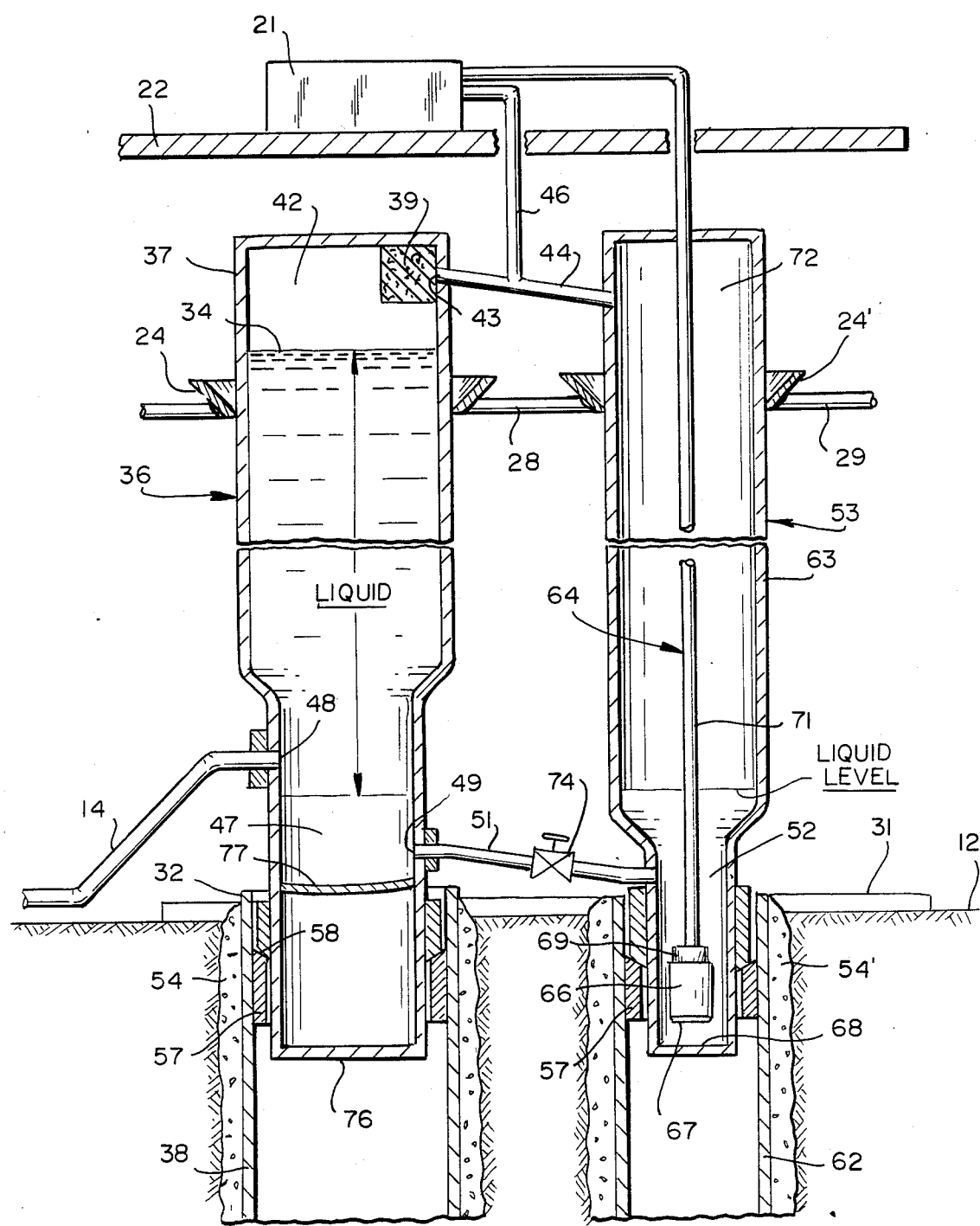
FIG. 2 is a segmentary view, on an enlarged scale of the upright fluid handling apparatus.

In accordance with the invention, and referring to FIG. 2, a slug catcher 36 is incorporated into marine structure 16 in a manner to be readily removed, or replaced. Slug catcher 36 includes primarily an elongated upper member 37 which is supportably engaged with and positioned within a lower or foundation segment 38.

The function of any slug catcher in conjunction with a multi-phase fluid conductor, is basically to separate the two fluids into liquid and vapor phases. This step is required since the production flow from the remote wells 10 to the platform or structure 16, will be comprised of intermittent slugs of gas in the liquid stream.

The elongated slug catching unit is registered in the vertically aligned conductor guides 24, 26 and 27 to be laterally supported in a generally upstanding disposition. Operationally, the composite liquid/vapor flow which enters the slug catcher 36 lower end from pipeline 14, will to a large extent be segregated into liquid and vapor phases.

Referring again to FIG. 2, upper segment 37 of the slug catcher is comprised of an elongated tubular casing having a sufficiently heavy wall thickness to resist both external water pressure, and internal gas pressure as the latter varies. Functionally, column segment 37 receives the composite hydrocarbon stream at its lower end, and dampens the surges that would normally result from a liquid slug being periodically received from the two phase flow in pipeline 14.

The lower end of casing 37 is narrowed or constricted to a smaller diameter. Casing 37 will thus register within, and be supported by foundation member 38, and is therefore sufficiently constricted to permit the supporting relationship.

An upper, surge dampening or pulse attenuation chamber 42 in casing 37, can extend to deck 22 to facilitate conducting produced gas from the chamber upper end, by way of an outlet 43 and a cross-conduit 44. The latter communicates with processing equipment 21 by way of conduit 46. This vaporous stream will normally contain a limited amount of liquid which can be separated at a de-mister 39 or similar flow treating member at the upper vapor outlet 43.

The lower, constricted end of column 37 includes a reservoir 47 into which the liquid portion of the composite production stream initially enters through inlet 48. The liquid level 34 within attenuating chamber 42 will normally vary through said chamber in accordance with back pressure at wells 10, and the liquid/vapor flow volume. This level will also adjust in respone to produced gas which moves upwardly and exits by way of upper discharge conduits 44 and 46.

Column 37 is provided with a lower discharge outlet 49 preferably positioned at an elevation below inlet 48. Thus, the liquid, after entering reservoir 47, will flow by gravity feed through the discharge outlet 49, and thence through connecting conduit 51. It will then be further discharged into sump 52 of the adjacently positioned receptor column 53.

The bottom end of slug catcher 36 is supportably positioned by the lower, or foundation segment 38. The latter is initially driven into the substrate in the manner of a drill conductor, and thereafter fastened in place with a grout sleeve 54 to assure a firm footing.

To assure proper alignment of the upper and lower segments of the slug catcher column 37, lower segment 38 is initially comprised as noted of an elongated conductor length. Said conductor is lowered by derrick 19, through the respective vertically aligned conductor guides, to the sea floor 12. Thereafter, the conductor is embedded into the substrate until reaching a desired depth either by gravity or by being driven. When at a desired depth, the conductor is in a substantially upright position having been vertically maintained through the respective vertically aligned conductor guides, and is then being grouted.

The fixed, elongated conductor is now severed at its lower end and the upper portion withdrawn, leaving only a relatively short stump 32 extending beyond sea floor 12. After the upper end of the severed conductor is withdrawn from the respective conductor guides, the lower, or foundation 38 is provided with a load bearing ring 57 which is capable of removably receiving the lower end of elongated, upper column segment 37.

Load bearing ring 57 is fixed in place within the upper portion of the foundation member 38, and includes a tapered recess 58 adapted to slidably engage a corresponding load transfer ring fixed to upper column segment 37.

While load bearing ring 57 will assure a limited degree of lateral support to column 37, its primary function is to position the column at a desired height. Further it firmly supports column 37 without imposing vertical loads or stress on marine structure 16, or the latter's members.

Figure 3:
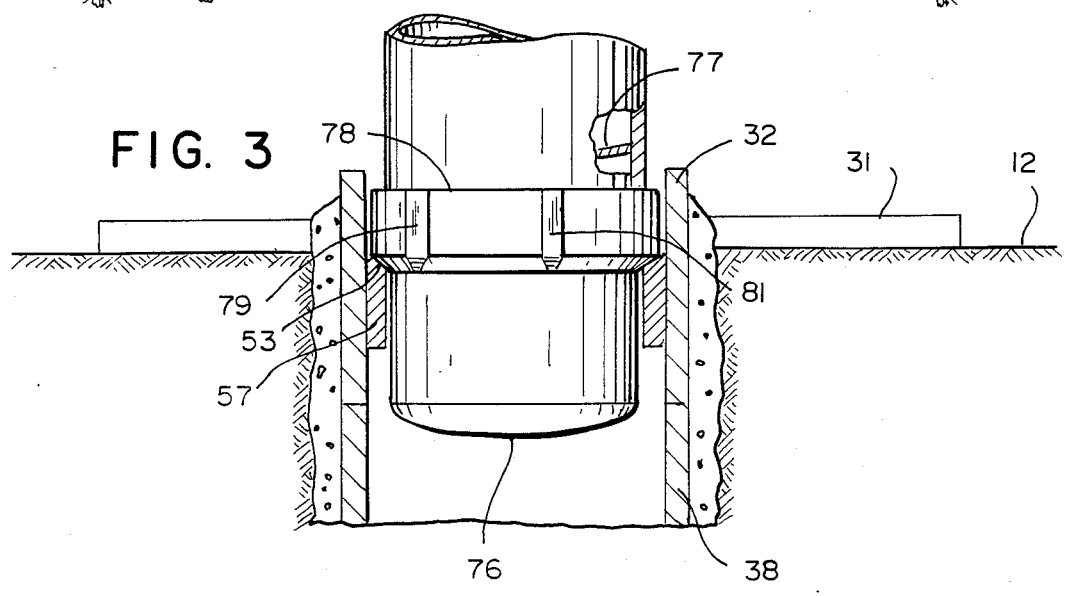
FIG. 3 is a segmentary view taken from FIG. 2.

Referring again to FIG. 3, removable engagement of the lower, narrowed end of column 37 with foundation member 38, is achieved without a positive fastening between said members. Upper column 37 is thus in one embodiment provided at its lower end with a bull nose 76 which forms a column end closure. A cap 77 positioned upwardly of the bull nose forms a transverse pressure seal at the column interior.

The upper end of foundation member 38 is provided as noted herein, about its interior with load bearing ring 57. The latter comprises essentially a cylindrical belt which is welded or otherwise fastened along the inner surface of the foundation member 38 wall, having a tapered seating surface 58 formed about the bearing ring upper edge.

The exterior wall of column 37 is furnished at its lower end with the comparable load transfer ring 78. The latter is comprised of a heavy wall peripheral band which is welded to the column inner surface. A series of spaced apart mounting pads 79 depend outwardly from load bearing ring 78, each pad including a tapered bearing surface 81 at the lower edge. The latter, when the column 37 is lowered into position, engages the upward facing seating surface 58 of foundation member 38 thereby providing the desired self-centering, upward support for the column.

Any physical strain which might be imposed on marine structure 16 due to the positioning of column 37 will be minimized and will generally be limited to lateral strain. The latter will result from the column being supported at the various levels of conductor guides 24, 26 and 27.

Deck 22 of marine structure 16, as a general practice, is supported several hundred feet above the sea floor 12. It will normally be advantageous or, in some cases, necessary to raise the liquid component of the composite production stream to deck level through pumping means.

As shown in FIG. 2, elongated receptor column or production riser 53 may be located in one drilling position or slot adjacent to slug catcher 36. Here, it will receive only the liquid segment of the composite fluid flow from pipeline 14. Said receptor column 53 comprises a lower portion or foundation pile 62 which is embedded into sea floor 12 in a manner similar to the embedment of the adjacent pile segment or column foundation 38. It further includes an upper segment 61 structurally similar to upper segment 36.

The receptor column foundation 62 is provided with an appropriate load bearing ring similar to 57', sufficient to support column 63 without imposing a load into the marine structure 16. Column 53 upper segment, while supported on ring 57' is laterally supported through the various conductor guides 24', 26', and 27' spaced therealong.

In a normal drilling operation, the aligned conductor guides 24, 26 and 27 are sufficiently large to slidably accommodate or register a standard 26 inch diameter conductor 23. Thus, in the present arrangement, both the lower foundation members 38 and 62, as well as the upper members 37 and 63, are limited to 26 inches in diameter thereby permitting sliding registry of the respective columns through the column guides.

In the instance of receptor column 53 this unit can be fabricated with a substantially lesser diameter since it encompasses the primary function of establishing a vapor holding annular closure 72 about elongated pump string 64. The latter comprises a downhole pump 66 having its inlet 67 at the floor 68 of the column 63. Pump 66 includes an outlet or discharge port 69 communicated through an elongated conduit 71 to the platform process equipment 21.

Operationally, liquid received from transfer conduit 51 enters sump 52, is pumped upwardly through conduit 71 and is deposited into the process equipment 21 on the deck 22.

Receptor column or production riser 53 will receive a certain, although limited amount of gaseous hydrocarbon from the composite production stream. This vapor residual, however, will rise as a result of a quiescent separation, through annulus 72, and be discharged through opening 74 at the column upper end, into cross-conduit 44. It will flow thence into process equipment 21 by way of conduit 46.

Functionally, when a composite fluid stream from wells 10, enters pipeline 14, it will be urged by gas pressure within substrate 11 through the pipeline. This pressurized stream as noted, will comprise crude liquid hydrocarbon and/or water, which is periodically interspersed with slugs or bubbles of gas. The composite, two phase stream will enter the lower end of the slug catcher or separator column 36 at a height of about 30 feet. The liquid segment of this composite stream will then flow directly through transfer conduit 51 to enter sump 52 at the lower or floor foundation end of the receptor column 63. Although it is not considered necessary to the basic function of this equipment, conduit 51 can include a flow controller 74.

Liquid production flow can be regulated in conduit 51 by adjustment of flow controller 74 if the latter is utilized. Such adjustment will be in accordance with the flow capability of the slug catcher 36, production riser 53, and processing equipment 21 to handle the liquid. The latter in turn will be governed in accordance with the rate of fluid flow from the various wells 10.

Flow controller 74 can assume the form of a choke valve or similar adjustable member which is preferably operated either automatically or manually from a deck positioned control system.

As the composite hydrocarbon flow enters slug catcher column 36, the liquid segment as noted will be passed directly through the transfer conduit 51 lower end, and into receptor sump 52. However, in accordance with the setting of flow controller 74, the liquid level 34 within the slug catcher column 37 may rise. Liquid which then accumulates in sump 52 will be received by pump 66 and transferred upwardly for deposition into the processing equipment 21.

As the liquid level 34 in slug catcher column 37 rises, its upward movement will be periodically interrupted by the discharge of a gas bubble into the liquid accumulation at the column reservoir 47. When the gas bubbles rise upwardy through the liquid mass, the latter will be progressively decreased therby assuring a substantially constant liquid flow into the receptor sump 52. Consequently a steady yet controlled flow of liquid at the process equipment is assured.

It is understood that although modifications and variations of the invention can be made without departing from the spirit and scope thereof, only such limitations should be imposed as are indicated in the appended claims.

We claim:

1. The combination with a marine structure fixed to the sea floor and having a deck with hydrocarbon processing equiment, at least one leg supporting said deck above water's surface, vertically spaced and aligned conductor guides positioned adjacent said at least one leg; a pipeline at the sea floor communicated at one end with at least one subsea well which is producing a composite hydrocarbon fluid stream comprised of liquid and vaporous hydrocarbon to conduct said composite hydrocarbon fluid stream from said at least one subsea well to said marine structure;
   an elongated fluid separator registered uprightly in at least one of said vertically alinged conductor guides in said marine structure and supported at the sea floor,
   said pipeline being communicated with said elongated fluid separator to deliver said composite liquid and vaporous hydrocarbon fluid stream thereto,
   an elongated production riser registered in another of said vertically aligned conductor guides in said marine structure and supported at the sea floor to form a liquid holding reservoir,
   first conductor means communicating said elongated fluid separator with said production riser to conduct hydrocarbon liquid to said liquid holding reservoir, and
   pumping means having a pump positioned in said liquid holding reservoir, and having a pump discharge communicated with said hydrocarbon processing equipment.

2. In the combination as defined in claim 1, including second conductor means communicating said elongated fluid separator with said hydrocarbon processing equipment to deliver vaporous hydrocarbon to the latter.

3. In the combination as defined in claim 1, wherein said elongated fluid separator includes an elongated pile having the lower end thereof embedded into the sea floor, and an elongated casing operably supported on said pile and registered in one of said vertically aligned conductor guides.

4. In the combination as defined in claim 3, wherein said fluid separator elongated casing includes a load bearing ring at the lower end thereof which is detachably supported on said embedded pile.

5. In the combination as defined in claim 1, wherein said elongated production riser includes a pile having the lower end embedded in the sea floor, and a casing operably positioned on said pile, and said pump discharge includes conductor means extending longitudinally of said casing defining an annular vapor holding passage.

6. In the combination as defined in claim 5, wherein said second conductor is communicated with said processing equipment and with said annular vapor holding passage, respectively.

7. In the combination as defined in claim 1, wherein said fluid separator includes an elongated casing having a lower, liquid holding compartment for communication with said pipeline to receive said composite hydrocarbon fluid stream, and an upper vapor holding segment, said pipeline and said first conductor, respectively, being communicated with said liquid holding compartment.

8. A multi-phase fluid separator apparatus for an offshore marine structure the latter being fastened to the sea floor having vertically aligned conductor guides adapted to register said fluid separating apparatus including:
   an elongated upright fluid separating column laterally supported in one of said marine structure aligned conductor guides,
   an attenuating chamber in said column having a discharge port at the upper end thereof to conduct hydrocarbon vapor from said chamber,
   an elongated production riser laterally supported by another of said marine structure conductor guides and having a hydrocarbon liquid holding reservoir at the riser lower end,
   pump means in said liquid holding reservoir including a discharge port for carrying pumped hydrocarbon liquids from said reservoir.

9. In the apparatus as defined in claim 8, wherein said elongated upright fluid separating column includes; a foundation segment embedded in the sea floor and having a seating surface, and a column operably engaging said seating surface in supported relation thereto.

10. Method for expanding the capability of an offshore marine structure located in a body of water, to treat a multi-phase fluid comprised of vaporous and liquid phases, said marine structure including:
   a deck holding multi-phase fluid processing equipment,
   at least one leg supportably positioning said deck above the water's surface, and
   conductor guides depending from said at least one leg and spaced apart in substantial vertical alignment between the deck and the floor of said body of water, which method includes:
   providing a multi-phase fluid separator comprised of: an elongated multi-phase fluid separating column having an inlet for communication with a source of the multi-phase fluid, and having a vaporous phase discharge means for communication with said multi-phase fluid processing equipment, and an elongated production riser having an inlet for communication with said fluid separator, and having at least a discharge port communicated with said fluid processing equipment, registering said elongated fluid separating column in at least some of said vertically aligned conductor guides, registering said production riser in other vertically aligned conductor guides, communicating said separator column with said production riser to deliver liquid phase fluid thereto, and to said multi-phase processing equipment, to deliver vaporous phase fluid thereto.

11. In the method as defined in claim 10, including the step of: embedding a foundation member into the floor of said offshore body of water prior to registering said elongated multi-phase fluid separator.

12. In the method as defined in claim 10, including the step of: embedding a foundation member into the floor of said body of water prior to registering said elongated production riser thereon.

* * * * *